No. 756,624. PATENTED APR. 5, 1904.
L. GSCHWIND.
SHUT-OFF VALVE.
APPLICATION FILED MAY 16, 1903.

NO MODEL.

Witnesses
Chas. K. Davies.
M. E. Moore.

Inventor
Leon Gschwind
by
Attorney

No. 756,624. Patented April 5, 1904.

UNITED STATES PATENT OFFICE.

LEON GSCHWIND, OF AKRON, OHIO.

SHUT-OFF VALVE.

SPECIFICATION forming part of Letters Patent No. 756,624, dated April 5, 1904.

Application filed May 16, 1903. Serial No. 157,361. (No model.)

*To all whom it may concern:*

Be it known that I, LEON GSCHWIND, a citizen of the United States, residing at Akron, in the county of Summit and State of Ohio, have invented certain new and useful Improvements in Shut-Off Valves, of which the following is a specification.

My invention relates to improvements in shut-off valves, and relates particularly to a valve to be used upon or in connection with gas-supply pipes for shutting off the supply of gas in case of accident or when the pressure has been relieved; and the object of my invention is the provision of a valve of the simplest, most durable, and cheapest construction which will be reliable, efficient, and practical in operation.

With this object in view my invention consists of an automatic shut-off valve embodying novel features of construction and combination of parts, substantially as disclosed herein.

Figure 1:
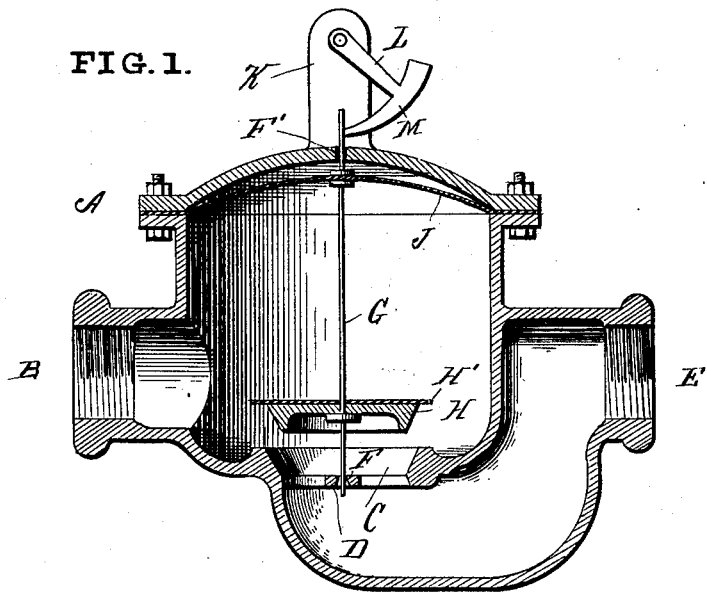
Figure 2:
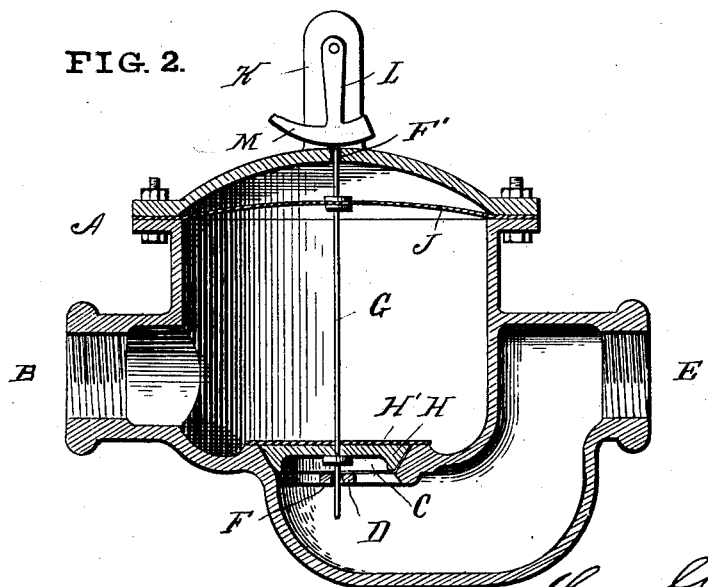

Figure 1 represents a sectional view of my valve with the parts in the position they occupy when the gas is flowing unrestrained through the pipes, and Fig. 2 represents a similar view with the parts as they are when the valve is shut off or closed to stop the supply of gas.

A designates the valve shell or casing, which is provided with the inlet B, the intermediate valve-seat C, of conical or tapering form, provided with the guide D, and the casing is further provided with the outlet E. Arranged vertically in the shell or casing and movable in an opening F of the guide and an opening F' in the top of the shell is the valve-stem G, carrying near its lower end the valve composed of the conical brass portion H, adapted to fit the conical seat of the casing, and the flat rubber cap H' for making a seal on said seat, and the upper end of the stem is secured to the flexible diaphragm J, which is secured by the cap or top of the casing.

The upper end of the valve-stem passes through the opening in the top of the casing, and the top of the casing is formed with the upright K, to which is pivoted at its upper end the lever L, having a catch or keeper M formed on its lower end, which is adapted to fall and rest upon the top of the valve-stem and secure the stem with the valve down and close the supply of gas. The catch on the lever is of curved form to cause it to bear or wedge upon the top of the stem and effectively hold the stem down.

In operation the parts are in the position shown in Fig. 1 and the gas flows through the casing; but instantly upon the happening of an accident or for any reason causing a reduction of the pressure the valve will fall and the pivoted lever will bring the catch down upon the valve-stem and hold the valve closed tight and make it absolutely impossible for any gas to pass through the outlet of the casing, thus automatically shutting off the supply of gas.

It will thus be seen that I provide a valve which will operate instantly and automatically to shut off the flow of gas and prevent accident and which by reason of its extremely simple, inexpensive, and durable construction will commend itself as desirable, necessary, and entirely practical.

I claim—

A cut-off device, consisting of the casing having the inlet, outlet and intermediate valve-seat, said seat being flared and formed with a guide, the vertical valve-stem guided in the top of the casing and in the guide of the valve-seat, the flexible diaphragm secured in the casing and connected near the upper end of the valve-stem, the conical valve secured near the lower end of the valve-stem, the cap-plate adjacent to the valve, the standard rising from the top of the casing and the pivoted lever having the catch for engaging the upper end of the stem for holding the valve closed.

In testimony whereof I affix my signature in presence of two witnesses.

LEON GSCHWIND.

Witnesses:
M. LIVINGSTONE,
SIMON WALKER.